United States Patent

Ho

[11] Patent Number: 5,951,147
[45] Date of Patent: Sep. 14, 1999

[54] MULTIPLE-PEG SPHERICAL LAMP-HOLDER

[76] Inventor: Bob Ho, No. 442-5, Ming Hu Road, Hsinchu City, Taiwan

[21] Appl. No.: 08/978,604

[22] Filed: Nov. 26, 1997

[51] Int. Cl.$^6$ ....................................................... F21P 1/00
[52] U.S. Cl. ............................................. 362/252; 362/249
[58] Field of Search ................................... 362/249, 252, 362/396, 806

[56] References Cited

U.S. PATENT DOCUMENTS 5,645,343  7/1997  Rinehimer ............................... 362/249
5,772,312  6/1998  Pihl-Neiderman et al. ............ 362/249

Primary Examiner—Sandra O'Shea
Assistant Examiner—Todd Reed Hopper
Attorney, Agent, or Firm—Rosenberg, Klein & Bilker

[57] ABSTRACT

The present invention relates to a multiple-peg spherical lamp-holder, in which the sphere is divided into six equational sectors, and two opposite sectors link together to form a piece, so there are three pieces in the spherical base, therein all of them splice together with each other just to combine a sphere. On each sphere sector at least a peg is built for a lamp to be seated on. For retaining the lamp firmly, the peg has several rows of pawls toward the sphere.

4 Claims, 3 Drawing Sheets

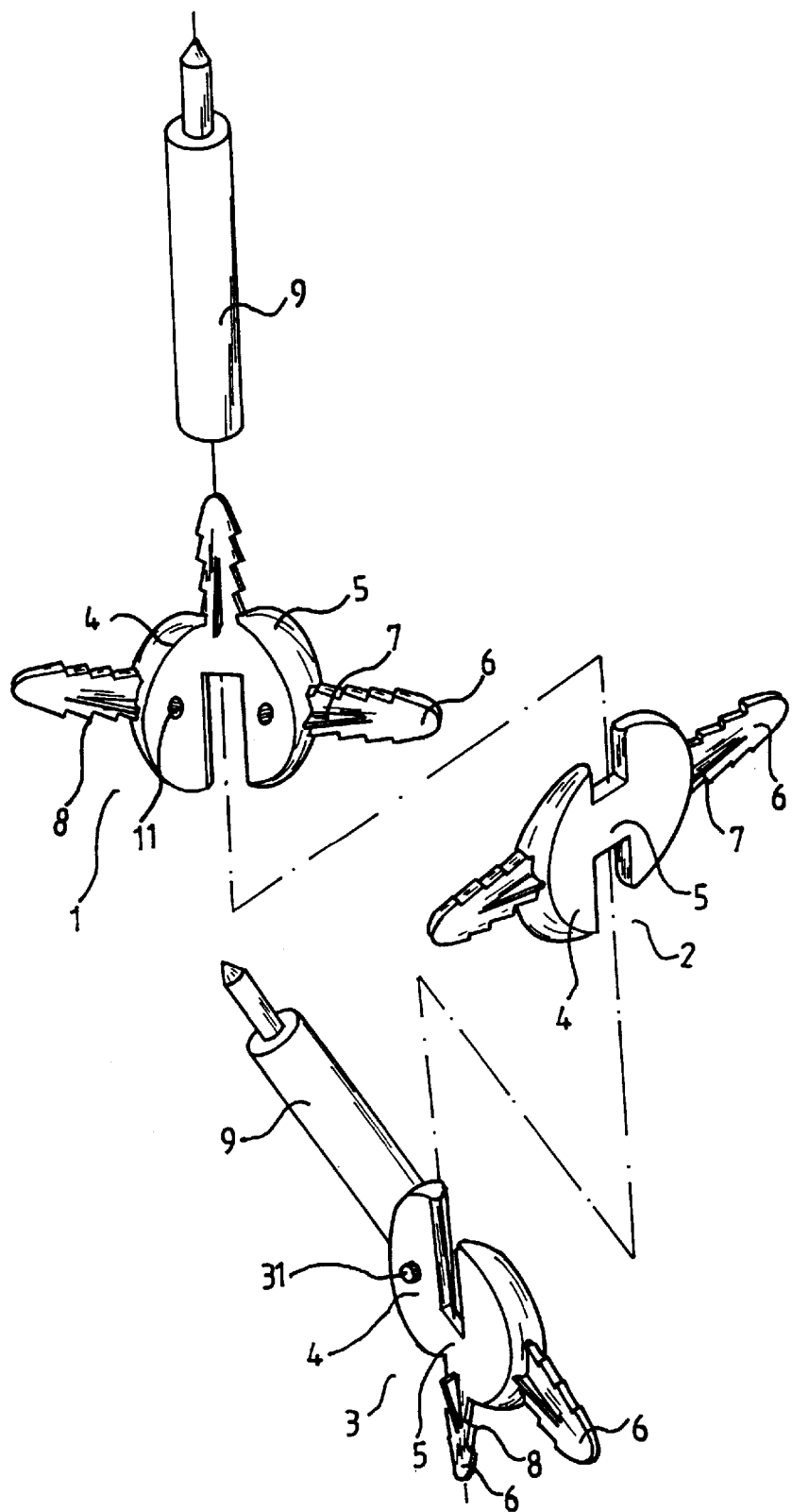
F I G . 1

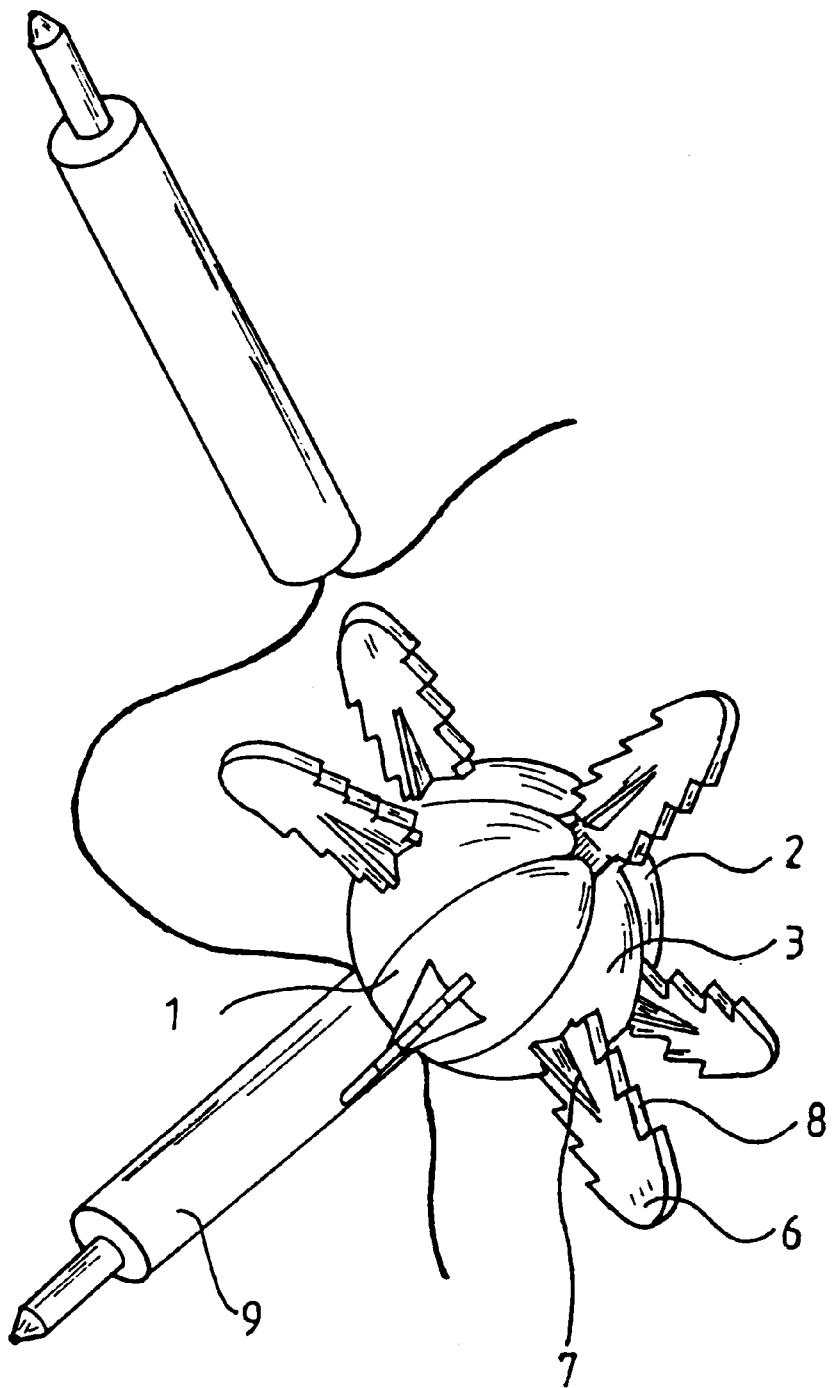
F I G . 2

MULTIPLE-PEG SPHERICAL LAMP-HOLDER

BACKGROUND OF THE INVENTION

1. Field of the Invention

The present invention relates to a multiple-peg spherical lamp-holder, and more particularly to a split-segment multiple-peg spherical lamp-holder on which several lamps are plugged.

2. Description of Prior Art

There is a great variety of conventional decorating lamps, like string, net, ball styles, etc. They are made use of for decorating homes, shops and public places of entertainment. But a spherical base holding multiple-lamps has not been seen in the market, because it is difficult to manufacture by a molding process and is so complicated that it has not been developed so far.

OBJECTS AND SUMMARY OF THE INVENTION

It is therefore a main object of the present invention to provide a multiple-peg spherical lamp-holder that is produced easily with low production cost, and packed and transported conveniently and simply.

This object is achieved by a split-segment multiple-peg spherical lamp-holder, in which the sphere is divided into six equational sectors, and two opposing sectors are linked together to form a single piece, so there are three pieces in the spherical base. The three pieces are combined together to form a sphere. On each sphere sector at least a peg is built for coupling a lamp thereto. For retaining the lamp firmly, the peg has several rows of pawls toward the sphere.

BRIEF DESCRIPTION OF THE DRAWINGS

FIG. 1 is an exploded view of the present invention;

FIG. 2 is a solid view of the present invention;

DETAILED DESCRIPTION OF THE PREFERRED EMBODIMENTS

Figure 3:
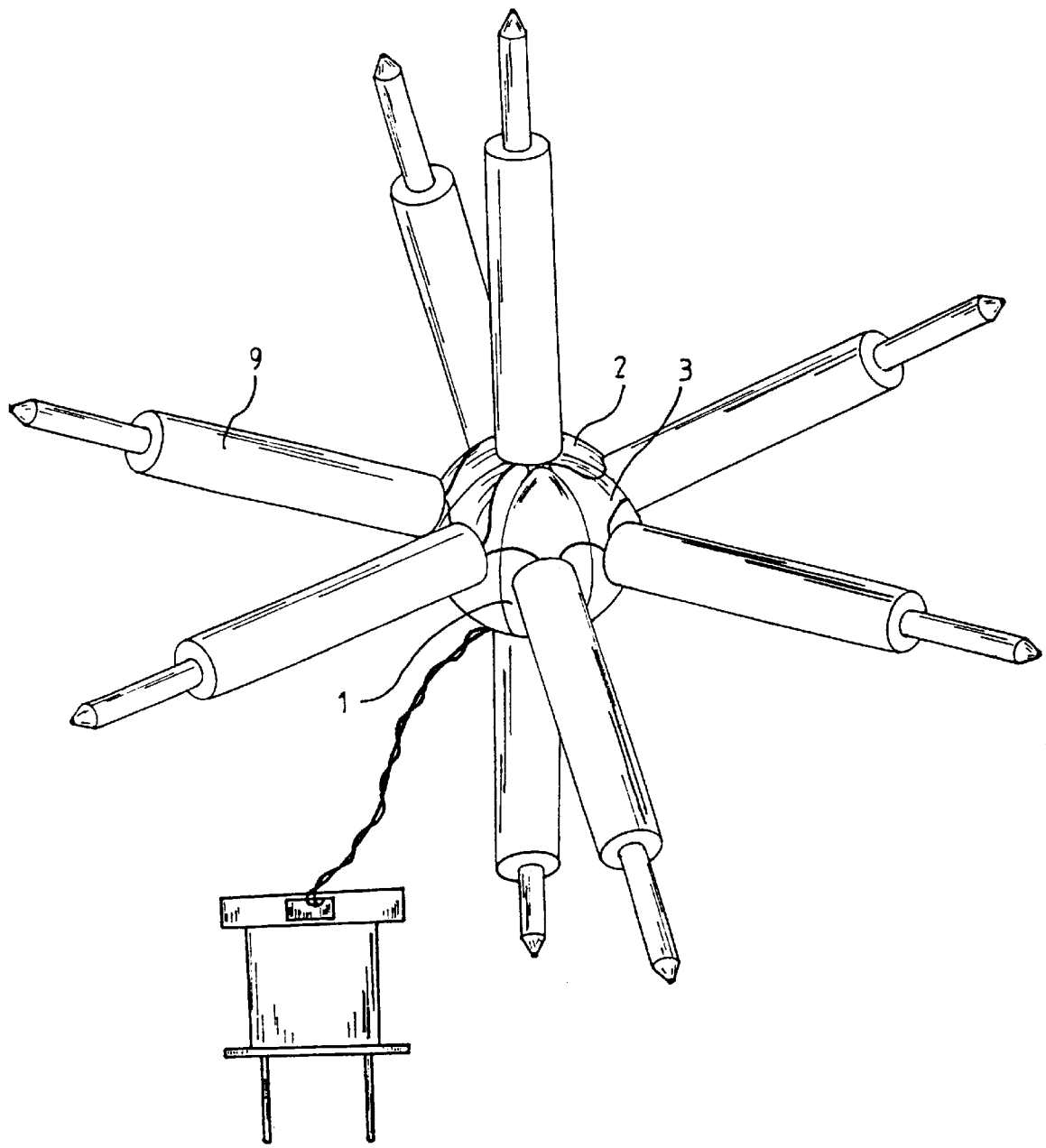
FIG. 3 is a solid view showing the combination of the present invention.

Referring to FIG. 1, the present invention includes three pieces 1, 2, and 3, in which each piece consists of two opposite sphere sectors 4 connected together via a connector 5. The three pieces are combined together to form a sphere. Referring to FIGS. 2 and 3, at least a peg 6 is built on the outer surface of each sector 4 of the pieces 1, 2, and 3 for coupling a lamp thereto. The peg 6 may be a strap with ribs 7 on both sides thereof, and on the both edges of the strap there is disposed several pawls 8 extending toward the sphere and arranged for retaining the lamp 9 firmly. On the connecting interfaces of the adjacent sectors of the first and last pieces 1 and 3, there is a socket 11 and a catching pin 31 formed on respective opposing sides thereof for joining the sectors together to firmly retain the integrity of the sphere.

I claim:

1. A multiple-peg spherical lamp-holder comprising three pieces, wherein each piece consists of two opposing sphere sectors joined together with a connecting portion of said piece, said three pieces being combined together to form a sphere, each piece having one or more pegs formed on an outer surface of each sphere sector, and a lamp is coupled to each peg.

2. A multiple-peg spherical lamp-holder as claimed in claim 1, wherein said peg has pawls extending toward the outer surface of the sphere.

3. A multiple-peg spherical lamp-holder as claimed in claim 1, wherein said peg is a strap, and there are ribs attached on the both sides of it.

4. A multiple-peg spherical lamp-holder as claimed in claim 1, wherein sides of adjacent sectors of two of said three pieces have a socket and a catching pin respectively formed on opposing sides thereof for coupling the two pieces together.

* * * * *